C. W. Le Count.

Bit.

N° 85,107.   Patented Dec. 22, 1868.

Witnesses:
A. W. Almquist
Wm A Morgan

C. W. LeCount
per Munn & Co
Attorneys.

C. W. LE COUNT, OF NORWALK, CONNECTICUT.

Letters Patent No. 85,107, dated December 22, 1868.

IMPROVED DRILL.

The Schedule referred to in these Letters Patent and making part of the same.

*To all whom it may concern:*

Be it known that I, C. W. LE COUNT, of Norwalk, in the county of Fairfield, and State of Connecticut, have invented a new and useful Improvement in Boring-Tools; and I do hereby declare that the following is a full, clear, and exact description thereof, which will enable those skilled in the art to make and use the same, reference being had to the accompanying drawings, forming part of this specification.

This invention relates to a useful improvement in tools for boring metals; and

It consists in grooving the sides of the drills for boring metals, whereby they are made to operate more perfectly, and with much greater ease than ordinary boring-tools.

In the accompanying plate of drawings—

Similar letters of reference indicate corresponding parts.

Figure 1:
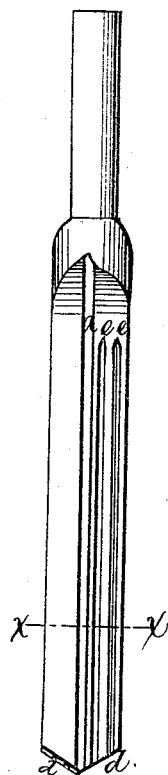
Figure 1 is a longitudinal side view of a drill for boring iron and other metals, constructed according to my invention.
Figure 2:
Figure 2 is an end view, showing the form of the cutting-edges.

This drill is made of any suitable length and size.

Upon each of the sides there is a principal groove, indicated in the drawing by *a*.

It will be seen that these grooves are not opposite each other, but that an angular cutting-lip is formed on each side of the centre of the drill, and at an angle to the ordinary cutting-edge of the drill of about forty-five degrees.

These grooves extend as far up the sides of the drill as may be desired.

Figure 3:
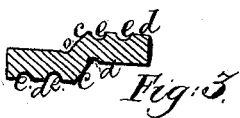
Figure 3 is a cross-section (enlarged) through the line *x x* of fig. 1.

*c c*, fig. 3, represent these angular cutting-lips; and

*d d*, the cutting-edges of the ordinary drill for boring iron.

In each of the cutting-edges *d d*, it will be seen that there are other grooves *e*, the position of which on the opposite sides of the drill varies, as seen in the drawing.

In boring with the drill thus grooved, ridges will be left by these small grooves *e*, as the drill is revolved, but the grooves being placed so that they do not travel in each other's track, the ridges of one pair of grooves will be cut out by the cutting-edges between the grooves of the other cutting-lip, and so on alternately, one lip cutting the ridges left by the other.

By this arrangement, the chips are so cut up, that the drill is prevented from choking or clogging.

A drill formed with the angular cutting-lips *c* and grooves *e*, requires much less pressure and much less power to bore iron than the common flat or the twist drill.

The outer angles of the cutting-lips *c* form an unerring guide for guiding the drill, which, of itself, is a matter of the greatest importance in performing work accurately.

These lips *c*, unlike the lips of the ordinary drill, cut to the centre of the hole; consequently the centre of the drill does not have to be forced, in boring, like that of the ordinary drill.

I do not confine myself to drills for boring metals in the use of the grooves.

In experimenting with augers and auger-bits, in boring hard wood, I have found that such augers and bits work much easier when grooves or nicks are cut in their cutting-lips, so that the chip may be cut up, and be discharged by the spiral pod, without clogging, and I contemplate applying this improvement to augers and bits for boring wood, as well as to drills for drilling iron.

Having thus described my invention,

What I claim as my improvement in drills, is—

1. Forming the two wings of the drill in parallel but different planes, so that the cutting-edge on each shall be in advance of the centre of rotation, and that the portion intervening, or that which unites the said wings of substantially the same thickness of metal, shall present cutting-edges at an angle of about forty-five degrees to the cutting-edges of the wings, substantially as described.

2. The longitudinal grooves *a a*, in the re-entering angles formed by the wing and intervening or central portion, substantially as described.

3. The longitudinal grooves *e e*, formed in the surface of the drill, as described.

The above specification of my invention signed by me, this 7th day of October, 1868.

C. W. LE COUNT.

Witnesses:
 FRANK BLOCKLEY,
 ALEX. F. ROBERTS.